March 16, 1937.  M. TIBBETTS  2,073,661
MOTOR VEHICLE
Filed June 5, 1933  2 Sheets-Sheet 1
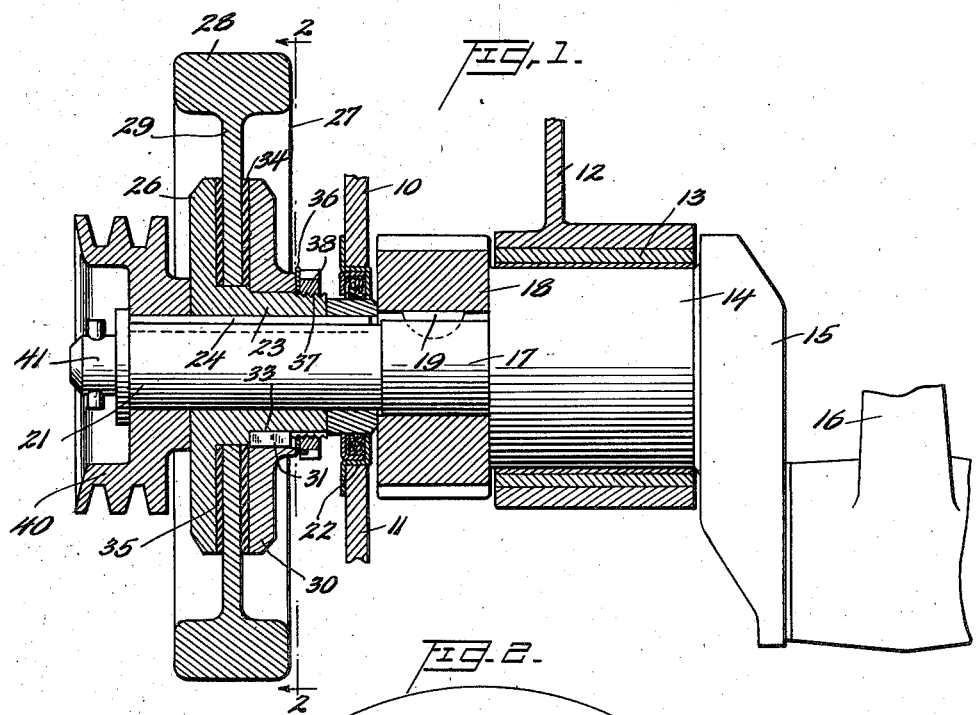
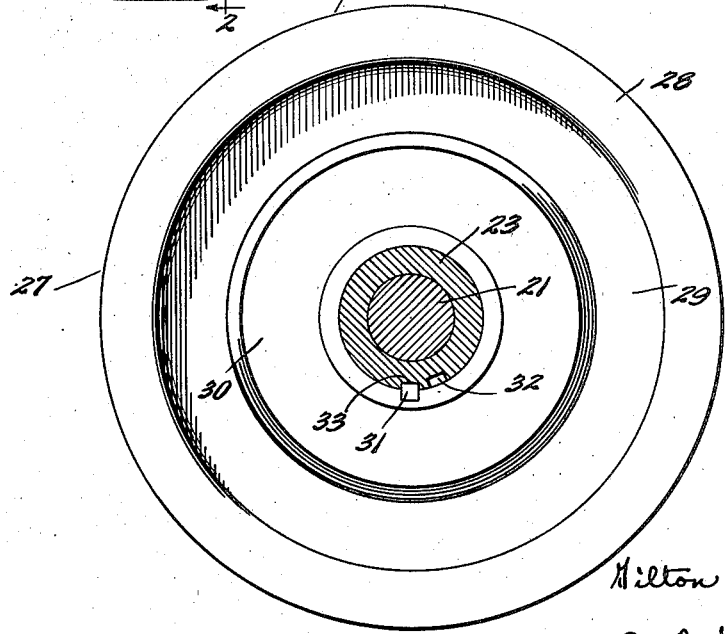
Inventor
Milton Tibbetts
By Watson, Cait, Horse & Grindle
Attorneys March 16, 1937.　　M. TIBBETTS　　2,073,661
MOTOR VEHICLE
Filed June 5, 1933　　2 Sheets-Sheet 2
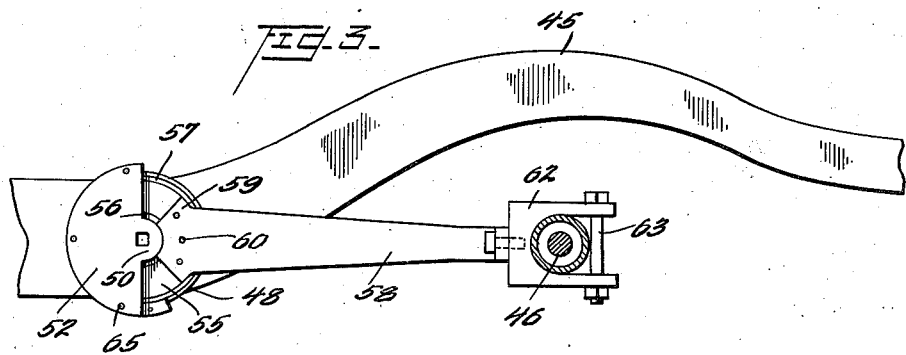
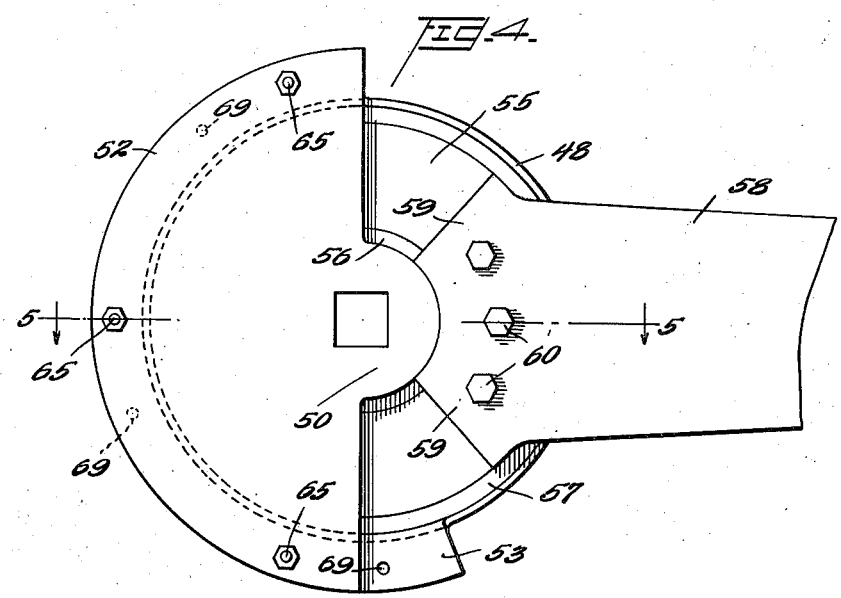
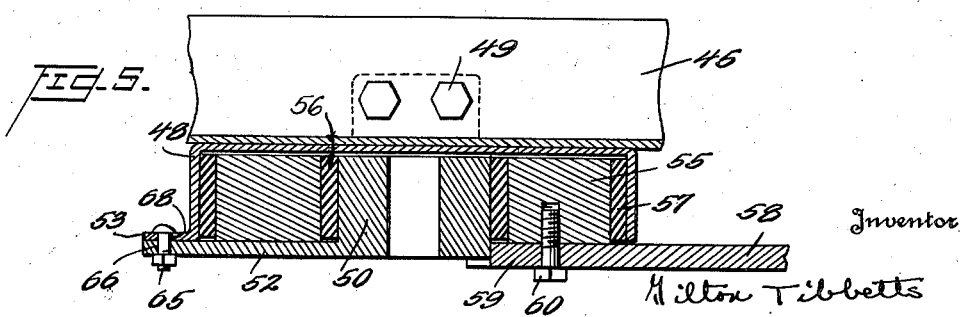
Inventor
Milton Tibbetts
By Watson, Cait, Morse & Grindle
Attorneys Patented Mar. 16, 1937

2,073,661

UNITED STATES PATENT OFFICE 2,073,661

MOTOR VEHICLE

Milton Tibbetts, Detroit, Mich., assignor to Packard Motor Car Company, Detroit, Mich., a corporation of Michigan Application June 5, 1933, Serial No. 674,460

8 Claims. (Cl. 74—574)

This invention relates to vibration absorbing devices and is particularly concerned with the damping of vibrations occurring in motor vehicles such as result from road shock or from the periodic impulses applied to the crankshaft of an internal combustion engine. It is the principal object of the invention to improve the operation of vibration dampers particularly as regards the absorption and dissipation of vibrations of small amplitude and high frequency such as are developed by high speeds of operation of modern internal combustion engines and motor vehicles.

The materials composed in part or entirely of rubber and similar substances have found wide employment in the field of vibration damping by reason of the high mechanical hysteresis which they exhibit, such materials being characterized by the development of considerable heat internally when subjected to distortion. Thus in vibration dampers for crankshafts, rubber has been successfully used as the resilient element for effecting the yieldable connection between the shaft and the relatively movable inertia member, the vibrations in the shaft serving to deform the rubber, whereby the vibrational energy is dissipated in the form of heat. Difficulty has been experienced, however, due to the failure of the rubber to respond to vibrations of small amplitude and extremely high frequency as the result of the extreme yieldability of the rubber, the degree of deformation of the rubber being insufficient to develop the necessary internal friction. The present invention contemplates the improvement of the behavior of rubber and similar materials when employed in this manner by maintaining the same in a state of tension, the rubber acting more quickly and developing greater internal friction when stretched.

Thus it is a more specific object of the invention to provide a vibration absorbing device employing two relatively movable members which are yieldably connected by an elastic deformable means such as rubber or the like in which an initial tensile or shearing stress is applied to the rubber, this stress being maintained during the normal functioning of the device. The invention may find employment in various types of vibration absorbing devices such as the conventional vibration dampers for crankshafts or shock absorbers acting between the axles and the frame of a motor vehicle. In the preferred embodiments of the invention, the rubber in the form of relatively thin sheets is interposed between contiguous relatively movable surfaces of the two members of the vibration absorbing device and is vulcanized to each. In order that the initial tension of the rubber may be readily applied and maintained one of the relatively movable members comprises two relatively displaceable elements, a sheet of rubber being interposed between each of these elements and the other member. Thus when the two elements are displaced with respect to each other and are secured in the relatively displaced positions the tension thus applied to the rubber is maintained independently of the relative movement of the two members during the normal functioning of the device.

Further objects and features of the invention will be apparent from the following description taken in connection with the accompanying drawings, in which:

Figure 1 is a longitudinal sectional view of a vibration damper for a crankshaft constructed in accordance with the principles of the invention;

Figure 2 is a transverse section on the line 2—2 of Figure 1;

Figure 3 is a side elevation of a portion of a vehicle frame illustrating the application of the invention to a vehicle suspension means or shock absorber;

Figure 4 is an enlarged elevational view of the shock absorber illustrated in Figure 3; and Figure 5 is a section on the line 5—5 of Figure 4.

In order to facilitate an understanding of the invention, the embodiments thereof illustrated in the drawings are described herein in detail. It will nevertheless be understood that no limitation is intended by the use of specific language and that such alterations of the structure disclosed are contemplated as fall within the spirit and scope of the invention.

Referring now to Figures 1 and 2 of the drawings, it will be observed that the numeral 10 represents the crank case of an internal combustion engine, having a lower cover or oil pan 11 and provided with transverse webs as shown at 12. The webs 12 support suitable aligned bearings 13 for an engine crankshaft 14, which is provided with the usual integral cranks 15, each crank being connected by a connecting rod 16 to a piston mounted in one of the engine cylinders. The pistons and cylinders are not shown in the drawings but are of the usual construction.

Forwardly of the first bearing 13, the crankshaft 14 is preferably formed with a reduced portion 17, on which a gear or chain sprocket 18 may be keyed or otherwise secured as indicated at 19, and used to drive the engine cam shaft or other engine accessories, which are not shown in the drawings. Forwardly of the sprocket 18, the crankshaft is preferably further reduced in size as shown at 21, and projects through a suitable opening 22 in the front wall of the crank case 10.

The vibration damper is illustrated as mounted at or adjacent the forward end of the crankshaft 14 and comprises a supporting portion or hub 23 keyed or otherwise rigidly secured to the crankshaft on the reduced portion thereof as indicated at 24, the hub 23 being provided with a radially disposed integral flange 26. Surrounding the hub 23 and concentric with the crankshaft axis, is an inertia member 27 having a web portion 29 and a rim portion 28, the latter being enlarged as desired to increase the inertia effect. An annular flanged element 30 surrounds the hub 23 and is secured for rotation therewith, for instance by the key 31 fitting in the keyway 33, it being observed that the flanged element 30 and the flange 26 of the hub 23 are spaced axially of the shaft to accommodate the web portion 29 of the inertia member therebetween, the inertia member being preferably journalled on the hub 23.

Annular sheets of rubber, rubberized fabric, or similarly acting material, 34 and 35 are interposed between the web portion 29 of the inertia member and the opposed contiguous faces of the flanged element 30 and the flange 26, the rubber being vulcanized or otherwise surface bonded as by cementing to these opposed faces and to the web portion 29 of the inertia member. The outer portion of the hub 23 is threaded as indicated at 37 to receive a nut 38 which engages the flanged element 30 through an interposed washer 36 to retain the element 30 against axial displacement. Under some conditions it may be desirable to thread the nut 38 on the hub 23 to an extent sufficient to effect some degree of compression of the rubber sheets 34 and 35 to further affect the characteristics of the rubber, it being understood, however, that the principal alteration of the characteristics of the rubber is obtained in accordance with the present invention by the circumferential tensioning of the rubber which may be varied to some extent by simultaneous axial compression thereof, for instance for the purpose of obtaining accurate adjustment of the tension to which the rubber is subjected to precisely control the characteristics of the damper.

In order that the desired tension may be readily applied to the rubber the following method is preferably observed in assembling the damper. The hub 23, the rubber sheets 34 and 35, the inertia member 27, and the flanged element 30 are first assembled in the manner indicated in Figure 1 of the drawings with the exception that the element 30 is so positioned on the hub that the key 31 which prevents relative rotation thereof may be inserted in the keyway 32, it being observed from Figure 2 that the two keyways 32 and 33 are spaced circumferentially of the hub 23. The nut 38 is then threaded in position and the rubber sheets are vulcanized to the contiguous surfaces of the inertia member and the shaft carried member. On the completion of the vulcanization the nut 38 is removed, the key is withdrawn from the keyway 32, and the flanged element 30 is rotated to an extent sufficient to permit the introduction of the key in the keyway 33. The nut 38 is then replaced and it is apparent by reason of the rotation of the flanged member 30, the rubber sheets 34 and 35 have been placed under tension by the shearing stress applied thereto and will be maintained permanently in a condition of deformation.

The damper is thus assembled in the form of a unit which may be slid on the forward end of the crankshaft and retained thereon against axial displacement by means of the pulley 40 which is in turn held on the shaft by the usual nut 41 which forms a coupling for engagement by the starting crank.

It will be evident that upon the occurrence of relative movement between the inertia member 27 and the shaft with its hub member 23 as the result of vibrations induced in the shaft, those portions of the rubber sheets 34 and 35 which are bonded to the hub member 23 and the flanged element 30 will be forced to partake of movement with the shaft, whereas such portions of the rubber sheets as are united to the inertia member will partake of the movement of the latter and the rubber sheets will be considerably distorted, causing a considerable loss of energy by hysteresis or internal friction with resultant damping of vibrations. As hereinbefore pointed out, the ability of the rubber to respond to vibrations of high frequency and small amplitude is intensified to a marked extent by reason of the permanent state of tension in which it has been placed.

Referring now to the form of the invention shown in Figures 3, 4, and 5, a portion of the side frame member 45 of the vehicle adjacent the rear axle 46 is illustrated, it being understood that the rear axle may be supported from the vehicle frame in any conventional manner to permit relative vertical movement of the axle and the frame when an irregular road bed is encountered. In order to prevent the development of synchronous movement of the frame and axle and to damp vibrations a shock absorbing device is connected between the axle and the frame. This device, as in the embodiment of the invention first described, comprises two relatively movable members and deformable elastic means such as rubber for resisting such relative movement. One of these members is secured to the frame and comprises two relatively displaceable elements, a substantially cup-shaped element 48 bolted to the side frame member as indicated at 49, and a hub element 50 having an annular sector-shaped flange 52 bolted to a flange 53 formed about a portion of the circumference of the element 48, these two elements providing an annular space within which is received the annular member 55. Annuli 56 and 57 of rubber or the like are interposed between the member 55, the hub element 50, and the cup-shaped element 48 and are surface bonded to the contiguous opposed faces of these parts, for instance by vulcanization of the rubber. An arm 58 having a sector-shaped portion 59 is secured to the member 55, for instance by bolts 60, and is connected at its outer end with the axle 46, for instance by means of a bracket 62 embracing the axle housing and clamped in position thereon by bolts 63.

Returning now to the means for securing the cup-shaped element 48 and the flange 52 of the hub element 50 together, it will be observed that a plurality of bolts 65 are employed, these bolts passing through apertures 66 spaced circumferentially of the flange 52 and through one of two sets of apertures 68 and 69 in the flange 53. In assembling the device the procedure hereinbefore set forth with reference to the first form of the invention is substantially followed.

The cup-shaped element 48, the hub element 50, the member 55, and the rubber annuli 56, 57 are first placed in the positions shown in Figure 5 of the drawings and the bolts 65 are inserted through the apertures 66 in the flange 52 of the hub element 50 and through the aperture 69 in the flange 53 of the cup-shaped element. The rubber is then vulcanized in position, the bolts 65 are withdrawn, and the elements 48 and 50 are rotated with respect to each other to an extent sufficient to permit the introduction of the bolts 65 in the apertures 66 and 68, thus applying a shearing and tensile stress to the rubber annuli 56 and 57. It will be appreciated that the rubber will be maintained under tension independently of any tension which may be applied thereto as the result of assembly of the shock absorber in a vehicle; in other words, the two annuli are stretched in opposite directions and the two movable members of the device are thus placed in a state of equilibrium with the rubber under tension independently of the vehicle load. It is in fact preferable to so assemble the shock absorber on the assembled vehicle that the tensile stress initially applied to the rubber is unchanged under normal operating conditions.

As in the first described embodiment of the invention the initial deformation of the rubber alters its operating characteristics and improves its response, the device acting more quickly and being capable of dissipating a greater amount of vibrational energy than otherwise on the occurrence of relative vibratory movement of the axle and frame.

It will be understood that the shock absorbing device disclosed herein may be connected between other parts of the vehicle partaking of relative movement during operation and is capable of functioning properly under all conditions in which a conventional shock absorber might be employed, or alternatively the device may serve as a primary suspension means to yieldingly support the vehicle load in lieu of the conventional leaf spring suspension.

The principles of the invention as outlined herein and as represented in the two forms thereof illustrated in the drawings are applicable to various other types of devices in which yielding means such as rubber may be employed to absorb or damp vibrations or to cushion shocks. It is important to note that the shearing or tensile stress initially applied to the rubber is not affected by relative movement of the elements of the devices herein illustrated during normal operation conditions, but is an initially applied and maintained stress on which may be superimposed other stresses such as are developed during use of the device under ordinary operating conditions.

Having thus described the invention, what is claimed as new and desired to be secured by Letters Patent is:

1. In a vibration absorbing device, the combination with a pair of relatively movable members, one of said members comprising two relatively displaceable elements, of deformable elastic means connecting each of said elements of the one member with the other member in such manner that relative displacement of said elements will place said derformable means under tension, and means associated with said elements for retaining the latter in such displaced relation to maintain the deformable means under tension.

2. In a vibration absorbing device, the combination with a pair of relatively movable members, one of said members comprising two relatively displaceable elements, of deformable elastic means connecting each of said elements of the one member with the other member in such manner that relative displacement of said elements will place said deformable means under tension in the direction of relative movement of said members, and means associated with said elements for retaining the latter in such displaced relation to maintain the deformable means under tension, said last named means forming a part of the said device.

3. In a vibration damper for crankshafts, the combination with a shaft carried member, of an inertia member movable circumferentially with respect to said shaft carried member, deformable means acting between said members to resist relative movement thereof, and means maintaining said deformable means in a state of initial tension in a circumferential direction to vary the operating characteristics thereof.

4. In a vibration damper for crankshafts, the combination with a shaft carried member, of a relatively movable inertia member, one of said members comprising two relatively displaceable elements, deformable means composed of rubber acting between each of said elements and the other of said members and surface bonded thereto to resist relative movement of said members, whereby said elements may be relatively displaced to apply a shearing stress to said deformable means, and means associated with said elements for permanently retaining said elements in such displaced relation.

5. In a vibration damper for crankshafts, the combination with a shaft carried member, of an inertia member supported for rotation about the axis of said shaft, one of said members comprising two spaced elements receiving the other of said members therebetween, said elements being relatively rotatable about the shaft axis, deformable elastic means interposed between each of said elements and the other of said members and connected therewith for yieldably resisting rotation of said inertia member, whereby relative rotation of said elements will apply a circumferential tensile stress to said deformable means, and means for retaining said elements in such relatively rotated position to tension said deformable means.

6. In combination, a crankshaft for internal combustion engines having a part thereon provided with a portion having a broad face, a vibration damper for said shaft including an inertia member having a portion thereof provided with a broad face positioned directly opposite to and in contiguous relation to said face of said part, means supporting said inertia member for oscillatory movement with respect to said part, a relatively thin sheet of rubber interposed between said faces and surface bonded thereto, and means for maintaining said rubber sheet in an initial state of tension in the direction of relative oscillatory movement of said part and member.

7. In combination, a crankshaft for internal combustion engines having a part thereon provided with a portion having a broad face, a vibration damper for said shaft including an inertia member having a portion thereof provided with a broad face positioned directly opposite to and in contiguous relation to said face of said part, means supporting said inertia member for oscillatory movement with respect to said part, a relatively thin sheet of rubber interposed between said faces and surface bonded thereto, and means for initially deforming said rubber sheet in the direction of relative oscillatory movement of said part and member to vary the characteristics thereof.

8. In a vibration damper for crankshafts, the combination with a shaft carried member, of a relatively movable inertia member, one of said members comprising two relatively displaceable elements, deformable means composed of rubber acting between each of said elements and the other of said members and surface bonded thereto to resist relative movement of said members, whereby said elements may be relatively displaced circumferentially of the shaft axis to apply a shearing stress to said deformable means, and means associated with said elements for permanently retaining said elements in such displaced relation.

MILTON TIBBETTS.